(12) United States Patent
Zhou et al.

(10) Patent No.: US 7,325,015 B2
(45) Date of Patent: Jan. 29, 2008

(54) CONFIGURING A COMPUTER APPLICATION WITH PRECONFIGURED BUSINESS CONTENT

(75) Inventors: Qi Zhou, Shanghai (CN); Song Chi, Shanghai (CN); Yueting Zhou, Shanghai (CN); Yufeng Zheng, Shanghai (CN)

(73) Assignee: SAP Aktiengesellschaft, Walldorf (DE)

( * ) Notice: Subject to any disclaimer, the term of this patent is extended or adjusted under 35 U.S.C. 154(b) by 341 days.

(21) Appl. No.: 11/063,979

(22) Filed: Feb. 24, 2005

(65) Prior Publication Data

US 2006/0190486 A1 Aug. 24, 2006

(51) Int. Cl.
G06F 17/40 (2006.01)

(52) U.S. Cl. ................ 707/104.1; 707/102; 707/103 R

(58) Field of Classification Search ............ 707/103 R, 707/203, 1, 10, 102, 104.1, 200; 717/121; 703/22; 705/14; 709/203, 228
See application file for complete search history.

(56) References Cited

U.S. PATENT DOCUMENTS

| | | | |
|---|---|---|---|
| 5,499,357 A | 3/1996 | Sonty et al. | |
| 5,619,716 A * | 4/1997 | Nonaka et al. | 717/167 |
| 5,838,918 A | 11/1998 | Prager et al. | |
| 5,913,218 A | 6/1999 | Carney et al. | |
| 5,923,850 A * | 7/1999 | Barroux | 709/224 |
| 6,519,571 B1 * | 2/2003 | Guheen et al. | 705/14 |
| 6,560,704 B2 | 5/2003 | Dieterman et al. | |
| 6,681,382 B1 | 1/2004 | Kakumani et al. | |
| 6,766,334 B1 * | 7/2004 | Kaler et al. | 707/203 |
| 6,775,829 B1 | 8/2004 | Kroening | |
| 6,775,830 B1 | 8/2004 | Matsunami et al. | |
| 6,779,000 B1 * | 8/2004 | Northrup | 707/103 R |
| 6,804,710 B1 | 10/2004 | Kawada et al. | |
| 6,816,964 B1 | 11/2004 | Suzuki et al. | |
| 6,922,705 B1 * | 7/2005 | Northrup | 707/103 R |
| 7,003,527 B1 * | 2/2006 | Lavallee et al. | 707/102 |
| 7,065,562 B2 * | 6/2006 | Courtney | 709/220 |
| 7,130,870 B1 * | 10/2006 | Pecina et al. | 707/203 |
| 7,165,041 B1 * | 1/2007 | Guheen et al. | 705/26 |
| 2003/0191776 A1 * | 10/2003 | Obrador | 707/104.1 |
| 2004/0143428 A1 * | 7/2004 | Rappaport et al. | 703/22 |
| 2004/0215656 A1 * | 10/2004 | Dill et al. | 707/103 R |
| 2004/0216090 A1 * | 10/2004 | Kaler et al. | 717/121 |
| 2004/0250247 A1 | 12/2004 | Deeths et al. | |
| 2005/0004942 A1 * | 1/2005 | Madsen et al. | 707/104.1 |

FOREIGN PATENT DOCUMENTS

EP 1443700 A3 * 10/2005

OTHER PUBLICATIONS

SAP Best Practices J00 Essential Information; pp. 1-53; (Nov. 2003).
SAP Service Marketplace publication entitled "Customizing Scout," Published Mar. 19, 2001; pp. 1-2.

* cited by examiner

*Primary Examiner*—Shahid A Alam
(74) *Attorney, Agent, or Firm*—Fish & Richardson P.C.

(57) ABSTRACT

Techniques are described that enable a user, such as a business analyst or a system administrator, to configure a computer application program that was developed by a commercial software developer for sale to many business enterprises. An automated process and tools enable preconfigured business content for an application program to be identified, modified and activated in order to configure the application program for use in a particular business enterprise. The preconfigured business content for an application program may include a set of parameter values that customize the application program for use in a particular country or geographic region, a particular industry, and/or a particular size of business enterprise.

18 Claims, 8 Drawing Sheets

800

Activation Log

| | | |
|---|---|---|
| IMG-ID:SIMG_CFMENUSAPCOVXI | TABLE:TVTW | RECORD: UPDATE SUCCESS |
| IMG-ID:SIMG_CFMENUSAPCOVXB | TABLE:TSPA | RECORD: UPDATE SUCCESS |
| IMG-ID:SIMG_CFMENUSAPCOVX5 | TABLE:TVKO | RECORD: UPDATE SUCCESS |
| IMG-ID:SIMG_CFMENUOLSDVOK0 | TABLE:T685 | RECORD: UPDATE SUCCESS |
| IMG-ID:SIMG_CFMENUORFBOB13 | TABLE:T004 | RECORD: UPDATE SUCCESS |
| IMG-ID:SIMG_CFMENUSAPCOVXG | TABLE:TVTA | RECORD: UPDATE SUCCESS |
| IMG-ID:SIMG_CFMENUSAPCOB45 | TABLE:T014 | RECORD: UPDATE SUCCESS |
| IMG-ID:SIMG_CFMENUORFBOBA1 | TABLE:T0305 | RECORD: UPDATE SUCCESS |
| IMG-ID:SIMG_CFMENUORFBOBA1 | TABLE:T030H | RECORD: UPDATE SUCCESS |
| IMG-ID:SAPC-OKBD | TABLE:TFKB | RECORD: UPDATE SUCCESS |
| IMG-ID:SIMG_CFMENUOLSDNV03 | TABLE:TNATI | RECORD: UPDATE SUCCESS |
| IMG-ID:SIMG_CFMENUORFBOBD4 | TABLE:T077S | RECORD: UPDATE SUCCESS |
| IMG-ID:SIMG_CFMENUORFBOB01 | TABLE:T691A | RECORD: UPDATE SUCCESS |
| IMG-ID:FIAPPY_V_T042B | TABLE:T042B | RECORD: UPDATE SUCCESS |
| IMG-ID:SIMG_CFMENUORFBOBC4 | TABLE:T004F | RECORD: UPDATE SUCCESS |
| IMG-ID:SIMG_CFMENUORFBOBC4 | TABLE:T004V | RECORD: UPDATE SUCCESS |
| IMG-ID:SIMG_CFMENUORFBOBC4 | TABLE:T004F | RECORD: UPDATE SUCCESS |
| IMG-ID:SIMG_CFMENUORFBOBC4 | TABLE:T004V | RECORD: UPDATE SUCCESS |
| IMG-ID:SIMG_CFMENUOLSDV/N5 | TABLE:T683 | RECORD: UPDATE SUCCESS |
| IMG-ID:SIMG_CFMENUORFBOB29 | TABLE:T009 | RECORD: UPDATE SUCCESS |
| IMG-ID:SIMG_CFMENUORFBOBY9 | TABLE:T004 | RECORD: UPDATE SUCCESS |
| IMG-ID:SIMG_CFMENUORFBOBY9 | TABLE:T004T | RECORD: UPDATE SUCCESS |
| IMG-ID:SIMG_CFMENUORFBOBY9 | TABLE:SKA1 | RECORD: UPDATE SUCCESS |
| IMG-ID:SIMG_CFMENUORFBOBY9 | TABLE:SKAT | RECORD: UPDATE SUCCESS |
| IMG-ID:SIMG_CFMENUORFBOBY9 | TABLE:SKB1 | RECORD: UPDATE SUCCESS |
| IMG-ID:SIMG_CFMENUORFBOB40 | TABLE:T030K | RECORD: UPDATE SUCCESS |
| IMG-ID:SIMG_CFMENUORFBOBBO | TABLE:T0100 | RECORD: UPDATE SUCCESS |
| IMG-ID:SIMG_CFMENUOLMEOME4 | TABLE:T024 | RECORD: UPDATE SUCCESS |
| IMG-ID:SIMG_CFMENUOLMSOMS2 | TABLE:T134M | RECORD: UPDATE SUCCESS |
| IMG-ID:SIMG_CFMENUORFBOBYR | TABLE:T074 | RECORD: UPDATE SUCCESS |
| IMG-ID:SIMG_CFMENUORFBOBYR | TABLE:T074U | RECORD: UPDATE SUCCESS |
| IMG-ID:SIMG_CFMENUORFBOBYP | TABLE:T03OU | RECORD: UPDATE SUCCESS |
| IMG-ID:SIMG_CFMENUSAPCOF01 | TABLE:FM01 | RECORD: UPDATE SUCCESS |
| IMG-ID:SIMG_CFMENUSAPCOVXK | TABLE:TVKCV | RECORD: UPDATE SUCCESS |
| IMG-ID:SIMG_CFMENUOLSDOVXT | TABLE:TTDS | RECORD: UPDATE SUCCESS |
| IMG-ID:SIMG_CFMENUSAPCOVX1 | TABLE:TVBUR | RECORD: UPDATE SUCCESS |

810

[Finished] 840

FIG. 8

CONFIGURING A COMPUTER APPLICATION WITH PRECONFIGURED BUSINESS CONTENT

TECHNICAL FIELD

This description relates to techniques for customizing transaction processing performed by computer systems.

BACKGROUND

Enterprise information technology (IT) systems often are used to manage and process business data. To do so, a business enterprise may use various application programs running on one or more enterprise IT systems. Application programs may be used to process business transactions, such as taking and fulfilling customer orders, providing supply chain and inventory management, performing human resource management functions, and performing financial management functions. Application programs also may be used for analyzing data, including analyzing data obtained through transaction processing systems. In many cases, application programs used by a business enterprise are developed by a commercial software developer for sale to, and use by, many business enterprises.

An application program may be customized to meet the specific requirements of the environment in which the application program is operating. For example, an application program running on a computer system may be customized to meet the specific requirements of a group of users, such as a particular business enterprise or a particular department in a company. Examples of such customization include customization of the data model, the process model, or the user interface of the application. Parameters in an application program may be customized to meet the requirements of a particular country, a particular industry, a particular company, or a particular department in a company so that the system accurately fulfills specific requirements of the operating environment, even highly specialized or localized requirements. Examples of customization include company-name parameter customization, company-organization-structure parameter customization, company-financial-information parameter customization, language parameter customization, unit parameter customization (e.g., metric versus English), format parameter customization (e.g., month/day/year versus day/month/year), work process parameter customization, and notation parameter customization. Customization of an application program may require knowledge of the data model, the process model, and/or the user interface of the application program. Customization of an application program also may require knowledge of programming techniques used to develop the application program. Typically, the customization occurs for an application program prior to, or as part of, deploying the application program in the business enterprise.

One approach to customizing an application program is to modify the computer programs of the application program. Another approach is to develop a second application program that performs a customized process and integrate the second application program with the original application program, for example, by exchanging data between the second, custom-developed application program and the original application program.

SUMMARY

Generally, the described techniques enable a user, such as a business analyst or a system administrator, to configure a computer application program developed by a commercial software developer for sale to, and use by, many business enterprises for use in a particular business enterprise. An automated process and tools enable preconfigured business content for an application program to be identified, modified and activated in order to configure the application program for use in a particular business enterprise. The preconfigured business content for an application program may include a set of parameter values that customize the application program for use in a particular country or geographic region, a particular industry, and/or a particular size of business enterprise. For example, preconfigured business content may include a set of parameter values to configure an application program for use by a small or medium-sized business enterprise. Preconfigured business content also may include data type definitions of data or reference data for use by the configured application program.

In one general aspect a computer application is configured for use in a particular business enterprise. The computer application includes instructions that, when executed, cause transaction data to be processed in a manner that is applicable to many different business enterprises. User selection is enabled of business functions provided by a computer application to be configured. Configuration information needed for the selected business functions is identified. The configuration information includes configuration information entries. Each configuration information entry has a configuration parameter attribute to control operation of the computer application and is able to be associated with at least one business function. User selection is enabled of a value for a particular configuration attribute in at least one of the identified configuration information entries. The value is applicable to the particular business enterprise. Multiple entries in the configuration information are identified where each configuration information entry has the particular configuration attribute. The value for the configuration attribute is stored in each of the identified multiple entries of configuration information.

Implementations may include one or more of the following features. For example, a configuration attribute may be presented with a default value, and user selection may be enabled of the default value or identification of a value that is different from the default value for the configuration attribute. A business function may include transaction data processing or analytical processing of transaction data.

The particular configuration attribute may be a first configuration attribute, and the value may be a first value. A second configuration information entry may be identified based on based on the first contribution attribute. The second configuration attribute may be different from the first contribution attribute. User selection may be enabled to identify a second value for the second configuration attribute where the second value is applicable to the particular business enterprise. The second value may be stored for the second configuration attribute in the second configuration information entry.

Configuration components may be identified that are needed for one of the selected business functions. A configuration sequence may be identified for using the identified configuration components to configure the computer application for use in the particular business enterprise. The computer application may be configured for use in the particular business enterprise based on the determined configuration sequence.

A selected business function may represent a business processing scenario. An identified configuration component may represent a configuration activity or a group of configuration activities. A configuration component may include multiple sub-components.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DESCRIPTION OF DRAWINGS

FIGS. 5-8 are block diagrams of example user interfaces for a configuration workbench to perform a process to configure a computer application with preconfigured business content for use by a particular business enterprise.

Like reference symbols in the various drawings indicate like elements.

DETAILED DESCRIPTION

Figure 1:
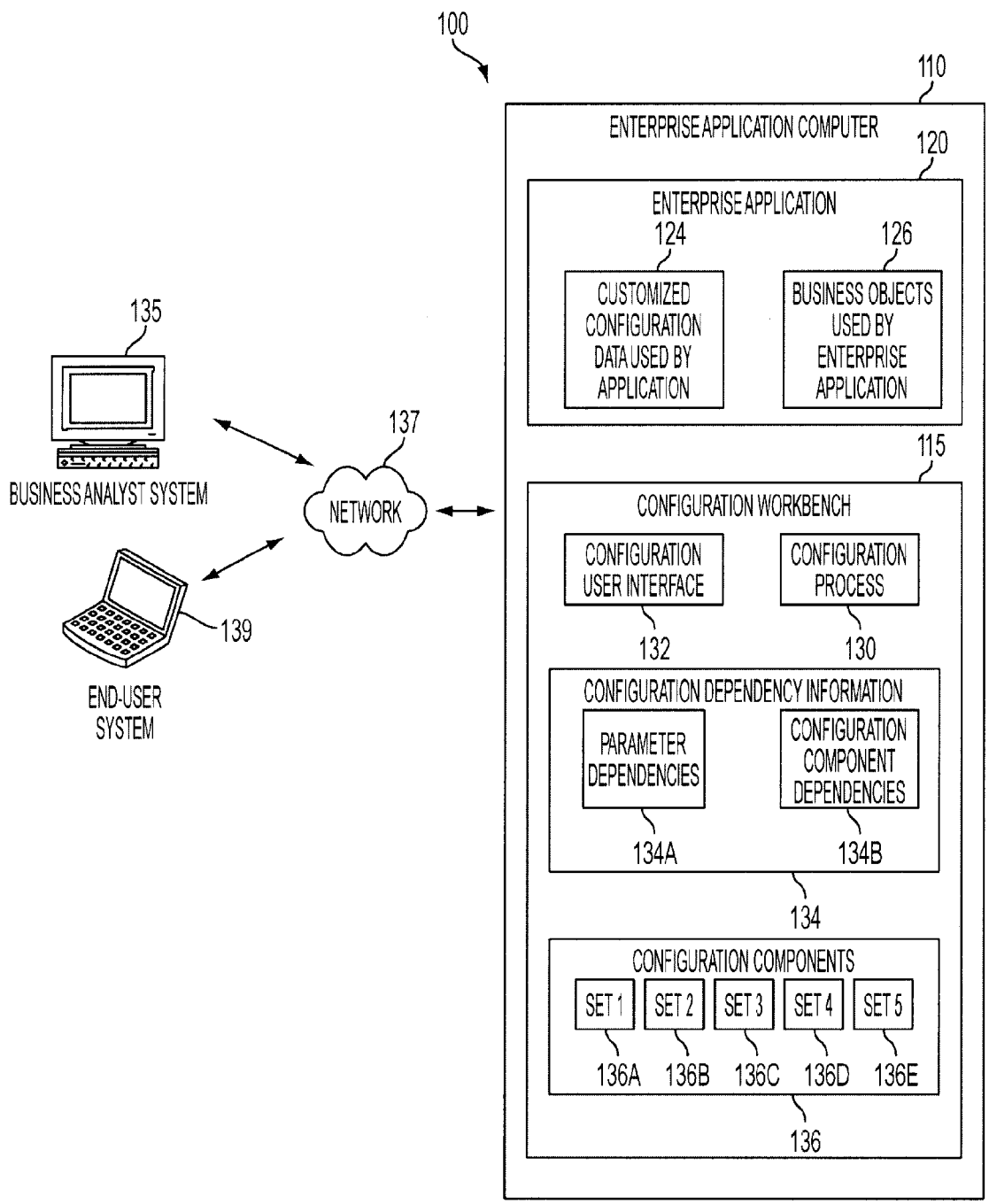
FIG. 1 is a block diagram of a system incorporating various aspects of the invention.

FIG. 1 shows a block diagram of a system 100 of networked computers, including a computer system 110 having a configuration workbench 115 that is able to configure an enterprise application 120 with preconfigured business content for use in a particular business enterprise. In general, a user, such as a business analyst or a system administrator who need not necessarily be a computer programmer, uses a computer system 135 to access, over a network 137, the configuration workbench 115 of the computer system 110 to execute a configuration process that directs and manages the loading of configuration parameters and/or other types of configuration components to control operation of the enterprise application 120 when the enterprise application is later deployed for use in a particular business enterprise.

More particularly, the system 100 includes the computer systems 110, 135 and 139, all of which are capable of executing instructions on data and all of which are interconnected via the network 137. The computer system 110 may be a general-purpose computer or a special-purpose computer. The computer system 110 includes a configuration workbench 115 and an enterprise application 120.

The configuration workbench 115 includes instructions for a configuration process 130 to direct and manage configuring the enterprise application 120 with preconfigured business content appropriate for use in the particular business enterprise. The configuration process 130, when executed, causes display of a graphical user interface on a display device of the business analyst computer 135 and enables a user of the business-analyst computer 135 to select business functions to be configured for use in the business enterprise and to enter values for configuration parameters used by the selected business functions. Also, when executed, the configuration process 130 automatically or semi-automatically identifies software configuration components that correspond to the selected business functions, determines a sequence of configuration for the identified configuration components, and activates the identified configuration components for use by the enterprise application 120, as described more fully below.

The configuration workbench 115 also includes configuration dependency information 134 having parameters dependencies 134A and configuration component dependencies 134B. The configuration workbench 115 includes configuration components 136A-136E of preconfigured business content (such as processes, data and configuration parameter values) available for use by the enterprise application 120. Each configuration components 136A-136E is used to configure one or more business functions for use in a particular business enterprise. The order applying the configuration components to the enterprise application 120 may depend on the business functions for which the enterprise application 120 is being configured to use. The configuration component dependency information 134B provides information that the configuration workbench 115 while executing the configuration process 136 uses to determine the order to activate, install or load some or all of the configuration components 136A-136E.

In some implementations, parameter dependencies 134A are used to identify a parameter value that applies to multiple configuration parameter attributes. For example, a company name may be stored in multiple persistent locations in the customized configuration data 124. Parameter dependencies 134A may be used by the configuration workbench 115 executing the configuration process 130 to identify multiple persistent locations to store a particular parameter value. This may help to allow a user to enter a parameter value one time and have the parameter value be stored in multiple locations, which, in turn, may help to reduce the time and effort required to configure an enterprise application for use by a particular business enterprise. This may be particularly useful in an enterprise application that includes many configuration parameter attributes (e.g., hundreds or thousands of parameter attributes) that enable a system administrator or business analyst to configure the enterprise application for use in a particular business enterprise. The configuration workbench 115 uses the configuration process 120, the configuration user interface 132, and configuration dependency information 134 to provide customized configuration data 124 that is used by the enterprise application 120. More particularly, the configuration workbench 115 displays functions from which the user of the computer system 135 selects. The configuration workbench 115 then identifies, without further user manipulation, software configuration components 136 that correspond to the business functions selected by the user. A configuration component may include configuration parameter values that are set to configure the application program for use in a particular country, geographic region, industry or sized business enterprise (such as a small or medium-sized business enterprise). A configuration component also may include data type definitions or data types that are used by an application program configured for use in a particular country, geographic region, industry or sized business enterprise. To do so, for example, the configuration workbench 115 may identify and present configuration parameters on a display device and enable a user of the computer system 135 to identify values or confirm presented values. The configuration workbench 115 uses configuration component dependencies 134B to determine sequence of the identified configuration components and, based on that sequence, performs operations necessary to configure the enterprise application 120 to perform the selected business functions in a manner customized for the particular business enterprise. To do so, the configuration workbench 115 sets the configuration parameters in customized configuration data 124 of the enterprise application to values identified in the configuration components or identified by the user. The configuration workbench 115 also may install data type definitions or reference data included in the configuration components for use by the configured application program. Once the enterprise application is deployed in the business enterprise, an end-user uses a computer system 139 to create and revise transaction data that is processed by the enterprise application 120.

In some implementations, configuration components dependencies 134B may include different levels of dependency information. For example, some of the dependencies 134B may relate to configuration components that represent a configuration activity that is related to specific functionality provided by the enterprise application 120. In contrast, other of the dependencies 134B may relate to configuration components that represent groups of configuration activities that are related to specific functionality provided by the enterprise application 120. The enterprise application 120 is an application program (or another type of data processing component) capable of performing multiple business functions. In one example, the enterprise application 120 is a commercial computer application that is developed and licensed (or sold) by a commercial software developer that is different from the business enterprise that uses the system 100. In another example, the enterprise application 120 and the configuration workbench 115 are part of a suite of commercial computer applications that are developed and licensed (or sold) by a commercial software developer for use by multiple, different business enterprises. The business enterprise that uses the system 100 may be referred to as a customer of the commercial software developer.

The enterprise application 120 includes customized configuration data 124 that includes configuration parameter attributes and attribute values that customize the enterprise application 120 for use in the particular business enterprise that uses the system 100. The customized configuration data 124 also may be referred to as configuration data or customer data. In one example, a commercial software developer may include one or more configuration database tables (or other type of data structure) that store configuration parameters.

The enterprise application 120 also includes particular portions of data, here referred to as business objects 126. Each business object in business objects 126 is a collection of data attribute values, and typically is associated with a principal entity represented in a computing device or a computing system. Examples of a business object include information about a customer, an employee, a product, a business partner, a product, a sales invoice, and a sales order. Business objects associated with a principal entity may be referred to as master data. Some implementations make a distinction between a master data object that refers to a principal entity and a transaction object that refers to a master data object. For example, a sales order object may be a transaction object that refers to a customer object, a type of master data object. A business object may be stored as a row in a relational database table, an object instance in an object-oriented database, data in an extensible mark-up language (XML) file, or a record in a data file. Attributes are associated with a business object. In one example, a customer business object may be associated with a series of attributes including a customer number uniquely identifying the customer, a first name, a last name, an electronic mail address, a mailing address, a daytime telephone number, an evening telephone number, date of first purchase by the customer, and date of the most recent purchase by the customer. In another example, a sales order business object may include a customer number of the purchaser, the date on which the sales order was placed, and a list of products, services, or both products and services purchased. In yet another example, a return request business object may include a customer number of the purchaser, an item number of the purchased item that the customer wishes to return, date on which the request was received, and an indication whether the return request was approved.

Examples of the network 137 include the Internet, wide area networks (WANs), local area networks (LANs), or any other wired or wireless network. Each of the business analyst system 135 and the end-user system 139 may be a general-purpose computer that is capable of operating as a client of the application program (such as a desktop personal computer, a workstation, or a laptop computer running an application program), or a more special-purpose computer (such as a device specifically programmed to operate as a client of a particular application program). For brevity, FIG. 1 illustrates only a single business analyst system 135 and a single end-user system 139 for system 100. However, actual implementations may include multiple business analyst and/or end-user computer systems.

In some implementations, the configuration workbench 115 may be implemented using a customizing layer that is separate from the application layer that implements the deployed enterprise application 120. The customizing layer may include data modeling and customization process model logic employed by the configuration workbench 115. As such, the customizing layer may include information about the structure, dependencies, and sequence of preconfigured configuration components or other collections of preconfigured business content. The customizing layer also may include information about the dependencies between configuration parameters used to customize the enterprise application 120. The customizing layer may be used to help manage business content used to customize and deploy the enterprise application 120. In one example, the configuration workbench may be implemented using a web services architecture that separates the customizing layer from the deployed enterprise application 120. The customizing layer may be referred to as a customizing abstraction.

In some implementations, the configuration workbench 115 may be based on a three-layer architecture. One layer of the architecture may provide data modeling for identifying configuration activity dependencies, which may be referred to as metadata of deployment. A second layer of the architecture may provide data modeling for deployment sequence of groups of business content, such as configuration components 136A-136E. A third layer of the architecture may provide program logic for deployment sequence generation and deployment execution. In some implementations, the deployment sequence may be generated dynamically based on program logic and, as such, need not necessarily be based on a predetermined sequence.

The system 100 enables a user to customize the enterprise application 120 for deployment in a particular business enterprise through the use of preconfigured business content. The ability of a user to customize the enterprise application 120 through the use of preconfigured business content may help to reduce the complexity, the time required, and the cost of deploying and customizing the enterprise application 120. This, in turn, may help to improve the quality of deployed enterprise application 120 and also may help to reduce the total cost of ownership of the enterprise application 120.

Figure 2:
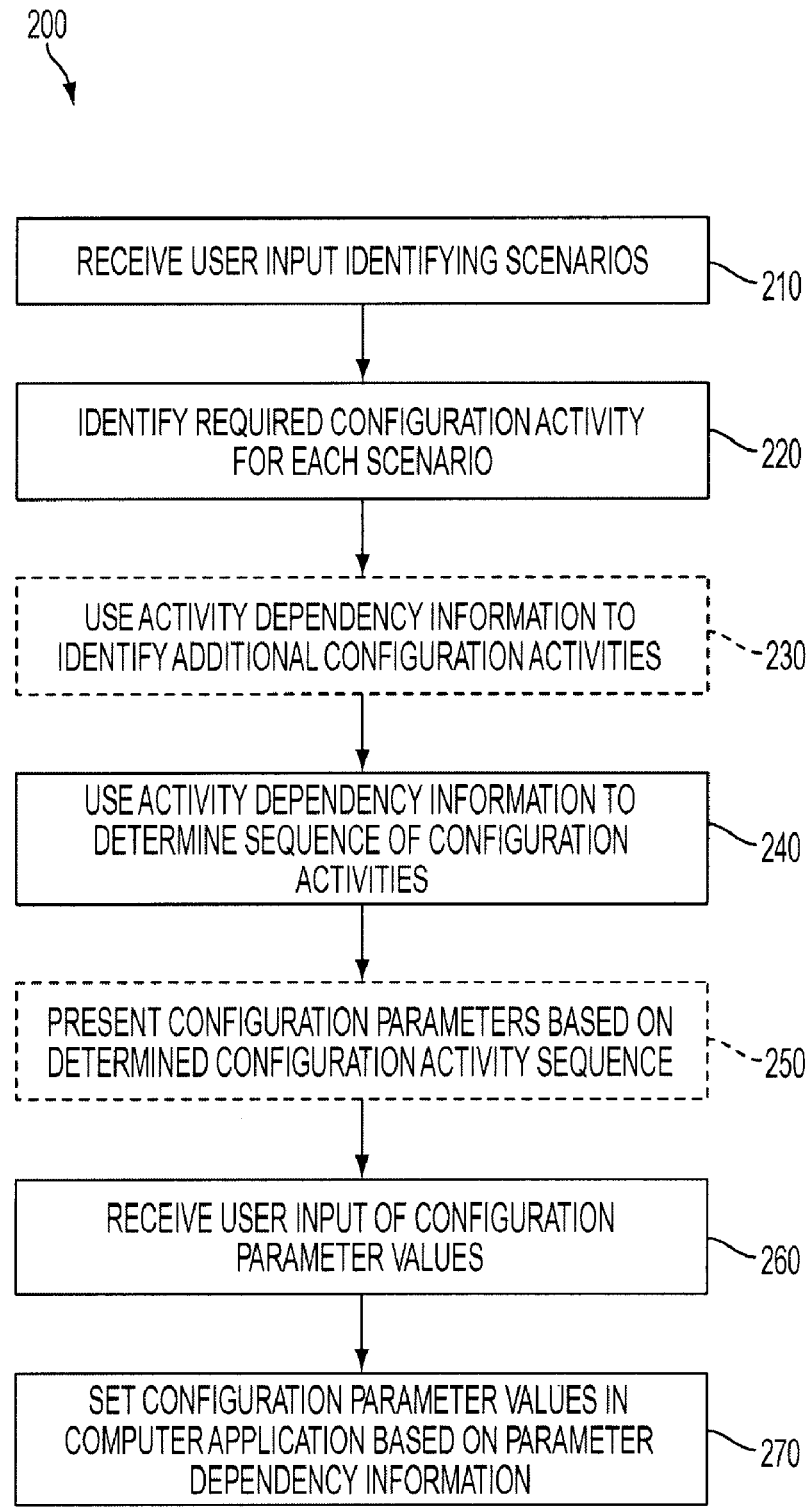
FIG. 2 is a flow chart of a process for automatically configuring a computer application with preconfigured business content for use by a particular business enterprise.

FIG. 2 depicts a process 200 for configuring a computer application with preconfigured business content for use by a particular business enterprise. In the example of process 200, the preconfigured business content is a collection of configuration parameters, all or some of which have default values, that are used to control processing performed by the computer application. Collections of related configuration parameters are grouped together, and a group of configuration parameters may be referred to as a configuration activity, a configuration set, or a configuration building block. A configuration activity is associated with one or more business process scenarios, each scenario descriptively refers to a one or more business functions that may be performed by the computer application. In some implementations, configuration parameters may be arranged in a hierarchy of groupings (such as a group of configuration parameters may be organized as a configuration activity, which is grouped with other configuration activities to form a configuration building block). In any instance, a configuration parameter is associated with a business function either directly, through an association with collection of configuration parameters, or through an association with a collection of business functions.

The process 200 may be performed by one or more processors in a system, such as, for example, the computer system 110 of FIG. 1. The processor is directed by a method, script, or other type of computer program that includes executable instructions for performing the process 200. Examples of such a collection of executable instructions include instructions for the configuration workbench 115 of FIG. 1. The process may be manually initiated by a business analyst, a system administrator or another type of user who desires to configure a computer application for use in a particular business enterprise. For example, a user may activate a configuration workbench that provides a graphical user interface for initiating and/or controlling a process performed by a configuration workbench.

The processor executing the process 200 receives user input identifying one or more business process scenarios for which the computer application is to be configured to perform (step 210). This may be accomplished, for example, when the processor uses a graphical user interface to present a list of possible scenarios, and receives a selection of one or more scenarios from the user.

The processor identifies the required configuration activities for each scenario (step 220). This may be accomplished, for example, using a database table or other type of reference data that associates configuration activities with scenarios. In some implementations, the processor may first identify all configuration activities associated with one of the scenarios and then eliminates duplicated configuration activities that have been identified as associated with more than one scenario such that a unique list of configuration activities is identified. Optionally, the processor may use activity dependency information to identify any additional configuration activities to be performed, as described more fully in FIG. 3.

The processor uses activity dependency information to determine a sequence of the identified configuration activities (step 240). This may be accomplished, for example, using a database table or other type of reference data that associates an order for configuration activities relative to other configuration activities. One example of such information is described in FIG. 3.

The processor presents configuration parameters identified in the configuration activities based on the determined configuration activity sequence (step 250). This may be accomplished by presenting configuration parameters in a user interface in an order relative to the configuration activity associated with each of the presented configuration parameters. In other words, configuration parameters that are associated with a preceding configuration activity are presented before configuration parameters that are associated with a subsequent configuration activity.

The processor then receives user input of configuration parameter values (step 260). For example, a user may enter a parameter value for a configuration parameter by keying in a particular value or by selecting a value from multiple presented values. The user input also may be in the form of a confirmation of a presented default value for a configuration parameter.

The processor sets configuration parameter values in the computer application (step 270). This may be accomplished, for example, by updating a configuration parameter to a value identified by the user in configuration data used by the computer application to control processing, such as customized configuration data 124 in FIG. 1. In some implementations, the processor may set configuration parameter values in the computer application based on parameter dependency information that identifies other configuration parameters that also need to be set to the same parameter value, such as parameter dependencies 134A. For example, a company name parameter value may be needed by multiple configuration parameters used by the computer application. In such a case, the processor sets each of the multiple configuration parameters to the same company name parameter value that was entered only once by the user.

Figure 3:
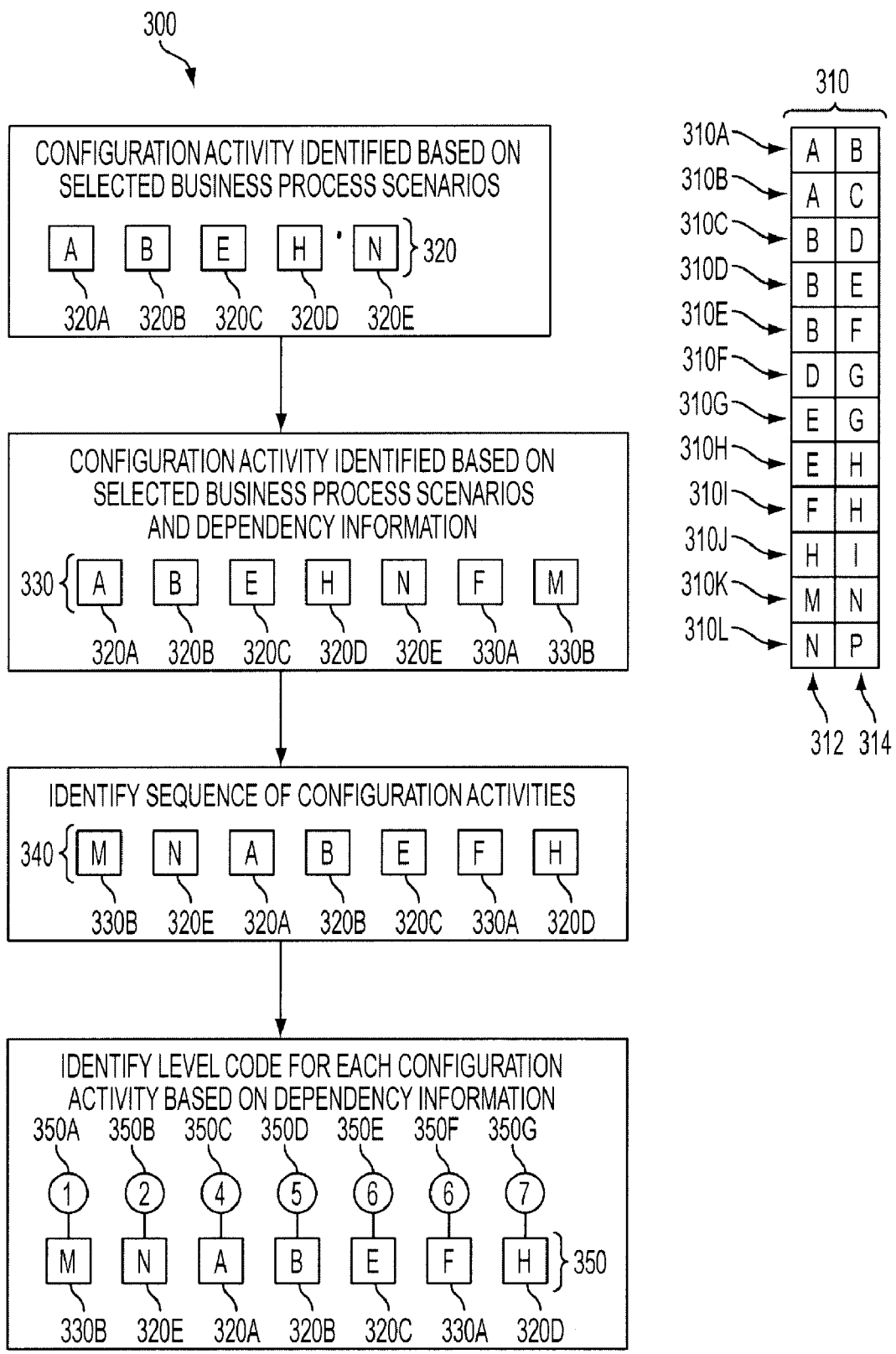
FIG. 3 is a flow chart of a process for identifying a configuration sequence of configuration components used to configure a computer application for use by a particular business enterprise.

FIG. 3 depicts a process 300 for identifying a configuration sequence of configuration components used to configure a computer application for use by a particular business enterprise. The process 300 may be performed by one or more processors in a system, such as, for example, the computer system 110 of FIG. 1. The processor is directed by a method, script, or other type of computer program that includes executable instructions for performing the process 300. Examples of such a collection of executable instructions include instructions for the configuration workbench 115 of FIG. 1. The process generally is programmatically initiated by a configuration process, such as configuration process 130 in FIG. 1.

The processor uses configuration activity dependency information 310 to identify additional configuration activities needed to configure the computer application to perform business processing scenarios selected by a user and to sequence configuration activity. The configuration activity dependency information 310 may be an implementation of configuration component dependencies 134B in FIG. 1. Each entry of configuration activity dependency information 310A-310C identifies a pair of configuration activities 312 and 314. Column 312 identifies a preceding configuration activity that is to be performed before the subsequent configuration activity identified in column 314 is performed.

The processor identifies configuration activities based on selected business process scenarios that identify or refer to one or more business functions (step 315). This may be accomplished as described in FIG. 1. or step 220 in FIG. 2. This results in identification of configuration activities 320A-320E.

The processor identifies additional configuration activities based on configuration activity dependency information (step 325). As illustrated, configuration activities 330A and 330B are added as required configuration activities. Configuration activity 300A is added because activity-dependency entry 310I indicates configuration activity 330A must precede configuration activity 320D, which was identified based on a direct relationship to a scenario. Similarly, configuration activity 330B is added due to activity-dependency entry 310K that indicates configuration activity 330B must precede configuration activity 320E, which was identified based on a direct relationship to a scenario.

The processor identifies a sequence of configuration activities (step 335). Activity-dependency entries are used to determine a sequence of configuration activities that satisfy all of the activity-dependency entries that include one of the configuration activities 320A-320E and 330A-330B. This may be accomplished by a comparison that progressively evaluates each combination of a pair of configuration activities. It is important to note that there may be multiple possible sequences that satisfy activity dependency information.

As illustrated, the configuration activities are ordered 330B, 320E, 320A, 320B, 320C, 330A and 320D. The order of configuration activity 330B satisfies the activity-dependency entry 310K that requires 330B (i.e., "M") precede 320E (i.e., "N"). The order of configuration activities 320A and 320B satisfies the activity-dependency entry 310A that requires 320A (i.e., "A") precede 320B (i.e., "B"). The order of configuration activity 320C (i.e., "E") satisfies the activity-dependency entry 310D that requires 320B (i.e., "B") precedes 320C (i.e., "E") and the activity-dependency entry 310H that requires 320C (i.e., "E") precede 320D (i.e., "H"). The order of configuration activity 320D (i.e., "H") satisfies the activity-dependency entry 310I that requires 330A (i.e., "F") precede 320D (i.e., "H") and the activity-dependency entry 310H that requires 320C (i.e., "E") precede 320D (i.e., "H").

The processor identifies a level code for each configuration activity (step 350). A level code 350A-350G is used to identify the sequence of performing a configuration activity. As illustrated, configuration activity 330B that is associated with a level code 350A having a value of one is performed prior to all other configuration activities 350B-350G, each of which has a higher level code. Configuration activities 320C and 330A each are associated with level codes 350E and 350F that each have a value of six. The order of performing configuration activities 350E and 350F is not important, as long as configuration activity 320B is performed before both of configuration activities 350E and 350F (as required by activity-dependency entries 310D and 310E). A level code may be a sequence number where each configuration activity is performed sequentially. A level code also may enable some configuration activities to be performed in parallel or overlapping in time. In some implementations, configuration activities may be related in hierarchy or tree.

Figure 4:
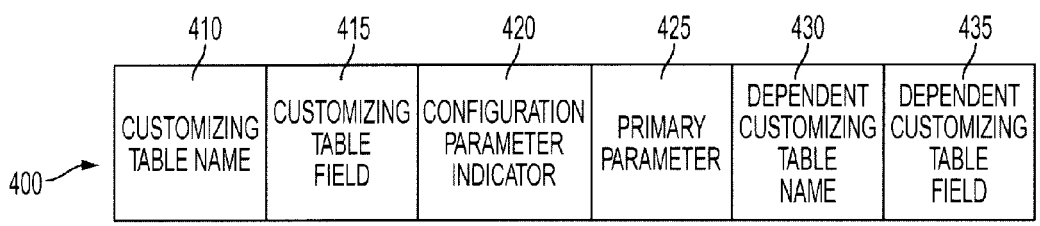
FIG. 4 is a block diagram illustrating an example data structure for use in configuring a computer application to use preconfigured business content.

FIG. 4 shows an example data structure 400 for configuration attribute dependency information, in simplified form. The data structure 400 includes attribute dependency information having a customizing table name 410 and a customizing table field 415 that identifies a particular parameter attribute in a database used by an enterprise application. The attribute dependency information 410 includes a configuration parameter indicator 420 that indicates whether an entry of attribute dependency information is a configuration parameter. The attribute dependency information 410 also includes a primary parameter indicator 425 that indicates whether an entry of attribute dependency information is a primary configuration parameter—that is, a value for the configuration parameter is entered, identified or confirmed by a user. When an entry of attribute dependency information is a primary configuration parameter, the attribute dependency information 410 includes a dependent customizing table name 430 and a dependent customizing table field 435 to identify an additional location where the parameter value is to be stored in the database used by the enterprise application. In some implementations, a particular parameter attribute identified by a customizing table name 410 and a customizing table field 415 may have more than one entry of configuration attribute dependency information.

FIGS. 5-8 illustrate examples of user interfaces that may be displayed to a user of a configuration workbench that is performing a process to configure a computer application with preconfigured business content for use by a particular business enterprise. In this example, the preconfigured business content is in the form of parameter attributes used to control transaction processing of an enterprise application. For example, FIGS. 5-8 may be an implementation of configuration user interface 134B in FIG. 1 and displayed by a computer system executing configuration process 134A in FIG. 1.

Figure 5:
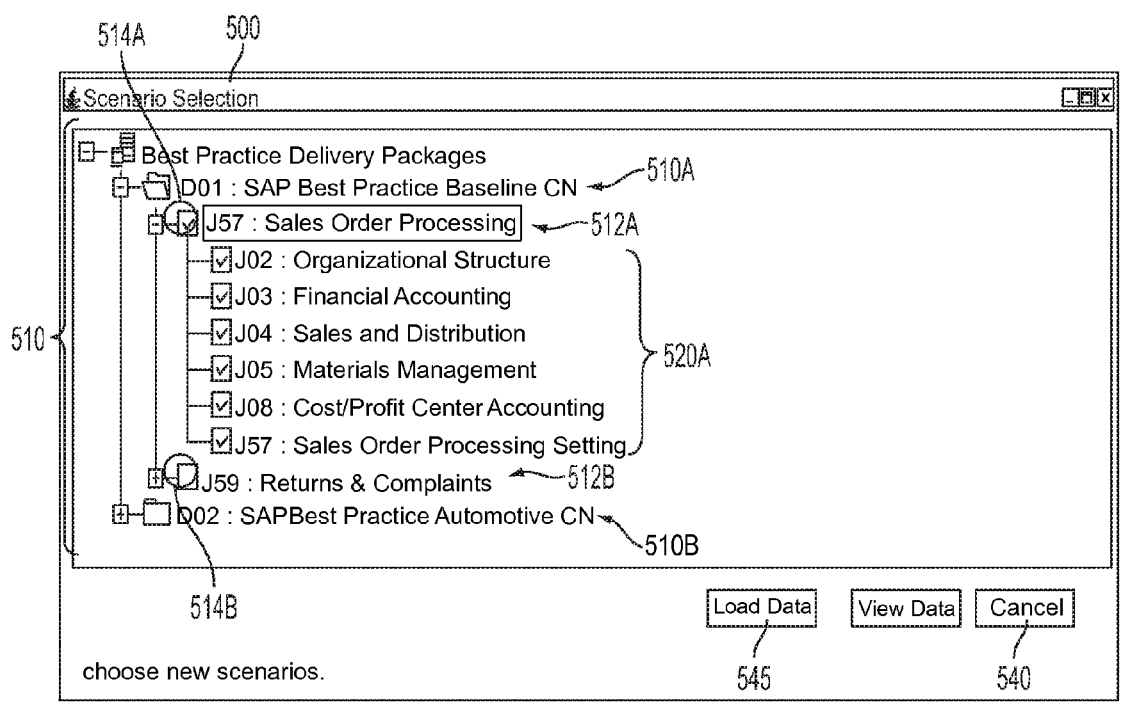

Referring to FIG. 5, a user interface 500 is displayed to enable a user to select one or more scenarios from multiple business processing scenarios (e.g., business functions) for which a computer application is to be configured with preconfigured business content. The user interface 500 includes a scenario selection window 510 displaying a list of scenarios from which the user makes selections. The scenarios are organized in a hierarchical arrangement with a first level of scenario groups 510A, 510B and a second level of scenario 512A, 512B. Each scenario 512A or 512B in the second level is subordinate to a first-level scenario group 510A or 510B. As illustrated, scenarios 512A and 512B are associated with scenario group 510A. A checkbox is located adjacent to each scenario. As illustrated, a checkbox 514A associated with scenario 512A is checked, which indicates that the computer application is to be configured to perform the scenario 512A. In contrast, a checkbox 514B associated with scenario 512B is not checked, which indicates that the computer application is not to be configured to perform the scenario 512B.

In addition, the scenario selection window 510 presents a list 520A of building blocks of preconfigured business content to be used to configure the computer application. In this implementation, a building block includes one or more configuration activities that identify configuration parameters to be set to configure the computer application. The scenario selection window 510 is organized into a visual tree and operable to enable a user to expand (i.e., make visible) and collapse (i.e., hide) portions of the tree. As illustrated, the scenarios associated with the scenario group 510B are hidden from view.

The user interface 500 includes a cancel control 540 that removes the user interface 500 from display. The user interface 500 includes a load data control 545 operable to initiate a process to identify configuration information associated with the selected scenario 512A, as described previously. In the example of user interface 500, the configuration information associated with the selected scenario 512A includes parameter attributes for which values are to be confirmed or modified, as illustrated in FIG. 6.

Figure 6:
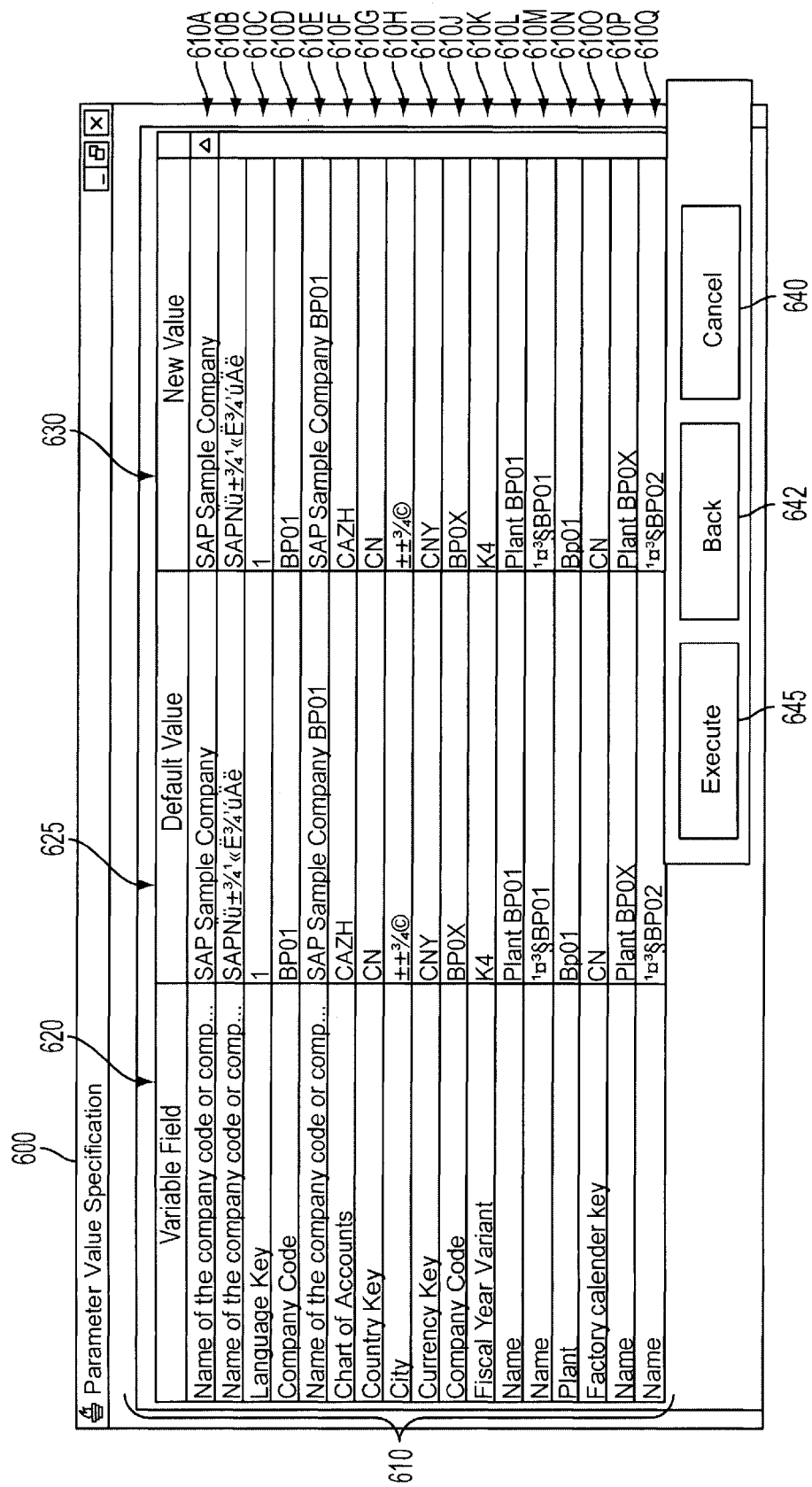

Referring to FIG. 6, a user interface 600 is displayed to enable a user to confirm or modify parameter values associated with the one or more selected scenarios. The user interface 600 includes a parameter specification window 610 having a row corresponding to each parameter to be confirmed or specified, a parameter name column 620, a default-value column 625, and a new-value column 630. The value in the parameter name column 620 identifies a name or other type of description for a particular parameter attribute. The default value for the particular parameter value is presented in the default-value column 625. Each of the parameter name column 620 and the default-value column 625 displays information that a user is not able to modify. The new-value column 630 initially includes the default value for each parameter attribute displayed in the window 610. However, the new-value column 630 is modifiable by a user and, as such, enables a user to enter a new value for, or otherwise modify the value for each parameter attribute displayed.

The user interface 600 includes a cancel control 540 that removes the user interface 600 from display. The user interface 600 also includes a back control 642 operable to display the user interface 500 and enable a user to add a scenario to the selected scenarios, de-select a previously selected scenario, or otherwise make additional or different scenario selections. The user interface 600 also includes an execute control 642 operable to initiate a process to sequence and perform configuration activities using on the parameter values confirmed or entered in the user interface 600. The sequence process may be, for example, an implementation of the process 300 described in FIG. 3.

Figure 7:
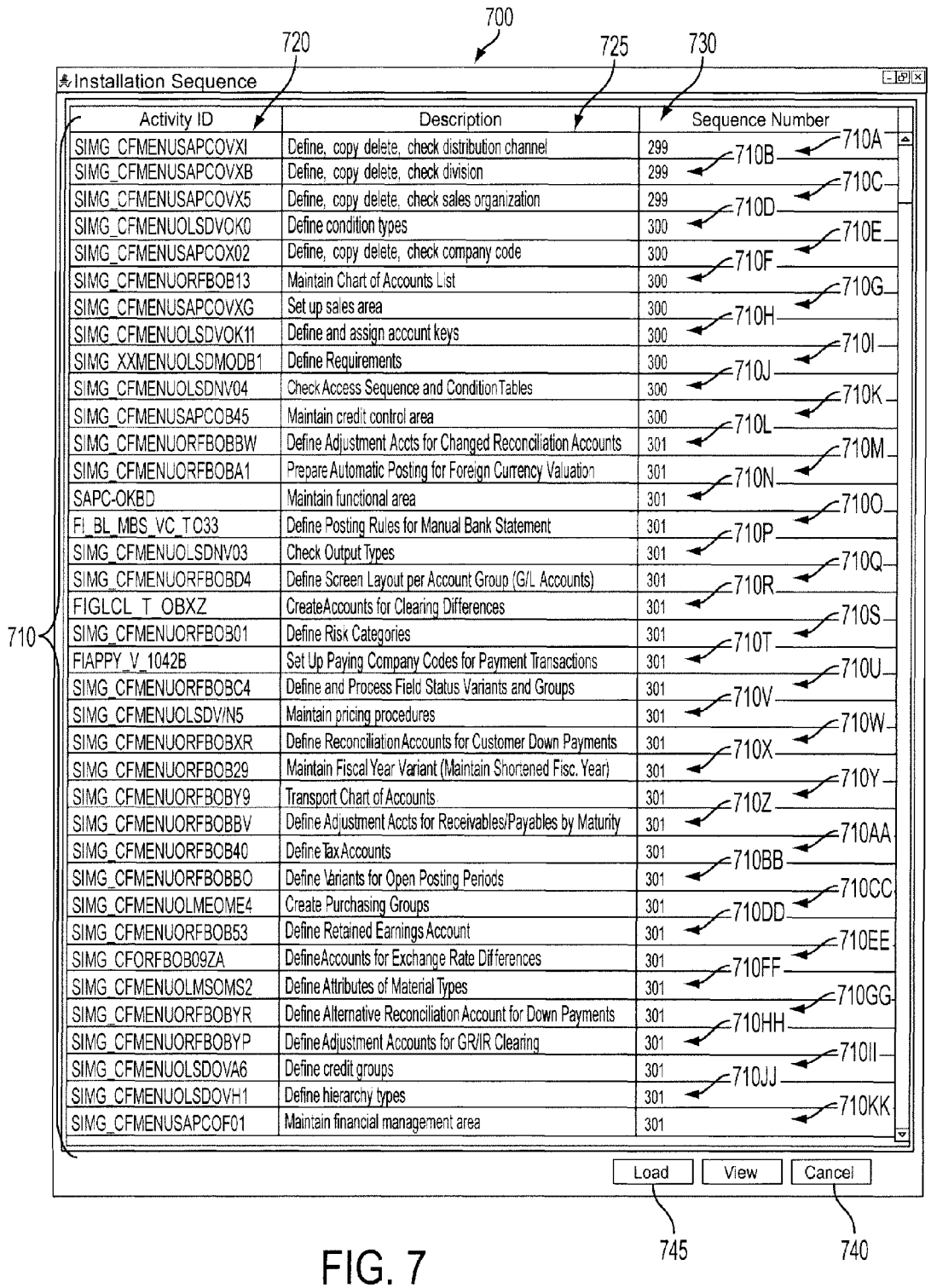

Referring also to FIG. 7, a user interface 700 presents a configuration activity window 710 that enables a user to preview the configuration activities 710A-710KK to be performed and the order in which the activities are to occur. More particularly, the configuration activity window 710 includes, for each configuration activity, an activity identifier 720 to uniquely identify a particular configuration activity, a description 725 that describes the activity to be performed, and a sequence number 730 that identifies the order that the activity is to be performed relative to other activities.

The user interface 700 includes a cancel control 740 that removes the user interface 700 from display. The user interface 700 also includes a load control 745 operable to initiate a process to perform the configuration activities 710A-710KK identified in the user interface 700. The load process sets the parameter values for use by one or more of the scenarios identified in the user interface 500 of FIG. 5. The load process, for example, may include setting a parameter value for multiple related (or identical) parameter attributes, as previously described. Once the load process is complete, feedback concerning the load process may be provided, such as depicted in FIG. 8.

Referring to FIG. 8, a user interface 800 presents an activation log window 810 that enables a user to review the results of a load process to configure the computer application to execute business process scenarios identified in user interface 500 in FIG. 5 based on parameters specified in user interface 600 in FIG. 6 and in the order automatically identified and presented in user interface 700 in FIG. 7. As illustrated in this example, each configuration activity is identified by activity identifier, a configuration table is identified, and an indication whether the parameter was successfully updated is presented. The user interface 800 includes a finished control 840 that removes the user interface 800 from display.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer program product tangibly embodied in a machine-readable storage device, the computer program product including instructions that, when executed, cause a configuration handling component to perform operations comprising:

enabling user selection of business functions provided by a computer application to be configured for use in a particular business enterprise wherein the computer application includes instructions that, when executed, cause transaction data to be processed in a manner that is applicable to many different business enterprises;

identifying configuration information that is related to the selected business functions wherein the configuration information includes configuration information entries, each configuration information entry 1) having a configuration parameter attribute to control operation of the computer application and 2) being associated with at least one of the selected business functions;

enabling user selection of a value for a particular configuration attribute in at least one of the identified configuration information entries, the value being applicable to the particular business enterprise;

identifying, in the configuration information, multiple entries that each has the particular configuration attribute;

storing the value for the configuration attribute in each of the identified multiple entries of configuration information;

identifying configuration components needed for at least one of the selected business functions;

determining a configuration sequence for using the identified configuration components to configure the computer application for use in the particular business enterprise; and configuring the computer application for use in the particular business enterprise based on the determined configuration sequence.

2. The computer program product of claim 1 wherein enabling user selection of a value comprises:

presenting a configuration attribute with a default value, and enabling user selection of the default value or user identification of a value that is different from the default value for the configuration attribute.

3. The computer program product of claim 1 wherein:

the particular configuration attribute is a first configuration attribute, the value is a first value, and the instructions, when executed, further cause the configuration handling component to perform operations comprising:

identifying, based on the first contribution attribute, a second configuration information entry having a second configuration attribute that is different than the first contribution attribute;

enabling user selection of a second value for the second configuration attribute, the second value being applicable to the particular business enterprise; and storing the second value for the second configuration attribute in the second configuration information entry.

4. The computer program product of claim 1 wherein at least one of the business functions comprises transaction data processing.

5. The computer program product of claim 1 wherein at least one of the business functions comprises analytical processing of transaction data.

6. The computer program product of claim 1 wherein the at least one of the selected business functions represents a business processing scenario.

7. The computer program product of claim 1 wherein an identified configuration component represents a configuration activity.

8. The computer program product of claim 1 wherein an identified configuration component represents a group of configuration activities.

9. The computer program product of claim 1 wherein a configuration component includes multiple sub-components.

10. A method of configuring a computer application for use in a particular business enterprise, the method comprising:

enabling user selection of business functions provided by a computer application to be configured for use in a particular business enterprise, the computer application including instructions that, when executed, cause transaction data to be processed in a manner that is applicable to many different business enterprises;

identifying configuration information that is related to the selected business functions wherein the configuration information includes configuration information entries, each configuration information entry 1) having a configuration parameter attribute to control operation of the computer application and 2) being associated with at least one business function;

enabling user selection of a value for a particular configuration attribute in at least one of the identified configuration information entries, the value being applicable to the particular business enterprise;

identifying, in the configuration information, multiple entries that each has the particular configuration attribute;

storing the value for the configuration attribute in each of the identified multiple entries of configuration information;

identifying configuration components needed for at least one of the selected business functions;

determining a configuration sequence for using the identified configuration components to configure the computer application for use in the particular business enterprise; and configuring the computer application for use in the particular business enterprise based on the determined configuration sequence.

11. The method of claim 10 wherein user selection of a value comprises:

presenting a configuration attribute with a default value, and enabling user selection of the default value or user identification of a value that is different from the default value for the configuration attribute.

12. The method of claim 10 wherein:

the particular configuration attribute is a first configuration attribute, and the value is a first value, and the method further comprising:

identifying, based on the first contribution attribute, a second configuration information entry having a second configuration attribute that is different than the first contribution attribute;

enabling user selection of a second value for the second configuration attribute, the second value being applicable to the particular business enterprise; and storing the second value for the second configuration attribute in the second configuration information entry.

13. The method of claim 10 wherein at least one of the business functions comprises transaction data processing.

14. The method of claim 10 wherein at least one of the business functions comprises analytical processing of transaction data.

15. The method of claim 10 wherein the at least one of the selected business functions represents a business processing scenario.

16. The method of claim 10 wherein an identified configuration component represents a configuration activity.

17. The method of claim 10 wherein an identified configuration component represents a group of configuration activities.

18. The method of claim 10 wherein a configuration component includes multiple sub-components.

* * * * *